United States Patent
Suzuki

(10) Patent No.: US 9,429,738 B2
(45) Date of Patent: Aug. 30, 2016

(54) ZOOM LENS AND OPTICAL APPARATUS HAVING THE SAME

(71) Applicant: Nikon Corporation, Tokyo (JP)

(72) Inventor: Kenzaburo Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/523,469

(22) Filed: Oct. 24, 2014

(65) Prior Publication Data

US 2015/0043078 A1 Feb. 12, 2015

Related U.S. Application Data

(63) Continuation of application No. PCT/JP2013/002326, filed on Apr. 3, 2013.

(30) Foreign Application Priority Data

Apr. 24, 2012 (JP) ................................ 2012-098812

(51) Int. Cl.
*G02B 13/00* (2006.01)
*G02B 15/173* (2006.01)
(Continued)

(52) U.S. Cl.
CPC ........... *G02B 13/009* (2013.01); *G02B 5/1814* (2013.01); *G02B 13/006* (2013.01); *G02B 15/16* (2013.01); *G02B 15/173* (2013.01)

(58) Field of Classification Search
CPC ........................... G02B 13/009; G02B 5/1814
USPC ....................................................... 359/576
See application file for complete search history.

(56) References Cited

U.S. PATENT DOCUMENTS

| | | |
|---|---|---|
| 4,984,876 A | 1/1991 | Hata et al. |
| 5,296,968 A | 3/1994 | Hata et al. |

(Continued)

FOREIGN PATENT DOCUMENTS

| | | |
|---|---|---|
| JP | 64-79718 A | 3/1989 |
| JP | 2551026 B2 | 11/1996 |

(Continued)

OTHER PUBLICATIONS

Ohara. S-NPH 1 [online]. Ohara, Oct. 22, 2006 [retrieved on Nov. 12, 2015]. Retrieved from the internet: https://web.archive.org/web/20061022015616/http://www.oharacorp.com/pdf/esnph01.pdf.*

(Continued)

*Primary Examiner* — Thomas K Pham
*Assistant Examiner* — Mitchell Oestreich
(74) *Attorney, Agent, or Firm* — Shapiro, Gabor and Rosenberger, PLLC

(57) ABSTRACT

Provided is a zoom lens having, in order from an object: a first lens group (G1) having positive refractive power; a second lens group (G2) having negative refractive power; and a third lens group (G3) having positive refractive power. The first lens group (G1) and the third lens group (G3) respectively move toward the object upon zooming from the wide-angle end state to the telephoto end state. The first lens group (G1) includes a diffraction optical element (DOE) in which two optical elements, constituted by optical materials of which refractive index difference at the d-line is 0.45 or less, are cemented and a diffraction optical surface (corresponding to the optical surface with the radius of curvature R8 in FIG. 1) on which diffraction grating grooves are formed, exists on the interface of the two optical elements. The zoom lens satisfies the following conditional expressions: $0.05<\phi 1/ft<1.00$, and $3.0<\phi d/y<10.0$, where $\phi 1$ denotes an effective diameter of a surface closest to the object in the first lens group (G1), ft denotes a focal length of the zoom lens (ZL) in the telephoto end state, $\phi d$ denotes an effective diameter of the diffraction optical surface, and y denotes a maximum image height of the zoom lens (ZL).

5 Claims, 11 Drawing Sheets

(51) Int. Cl.
*G02B 5/18* (2006.01)
*G02B 15/16* (2006.01)

(56) References Cited

U.S. PATENT DOCUMENTS

| | | | |
|---|---|---|---|
| 7,057,827 B2 | 6/2006 | Wakazono | |
| 7,295,387 B1 | 11/2007 | Ohmori et al. | |
| 7,369,325 B2 * | 5/2008 | Sato ................... | G02B 15/173 359/686 |
| 8,139,295 B2 * | 3/2012 | Suzuki ................ | G02B 5/1823 359/576 |
| 2003/0076591 A1 | 4/2003 | Ohmori et al. | |

FOREIGN PATENT DOCUMENTS

| | | |
|---|---|---|
| JP | 11-305126 A | 11/1999 |
| JP | 4557585 B2 | 10/2010 |

OTHER PUBLICATIONS

International Search Report from International Patent Application No. PCT/JP2013/002326, Jul. 9, 2013.

Written Opinion of the International Search Authority from International Patent Application No. PCT/JP2013/002326, Jul. 9, 2013.

Written Opinion of the International Searching Authority from International Patent Application No. PCT/JP2013/002326, Jul. 9, 2013.

Office Action issued Sep. 8, 2015, in Japanese Patent Application No. 2014-512323.

* cited by examiner

FIG.5
LATERAL ABERRATION
TANGENTIAL     1.00 RELATIVE FIELD HEIGHT (6.445)°     SAGITTAL
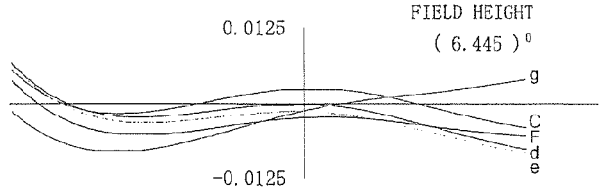 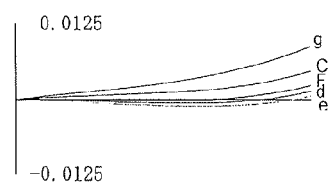
0.73 RELATIVE FIELD HEIGHT (4.731)°
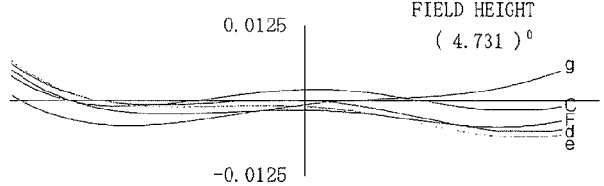 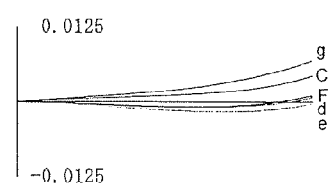
0.49 RELATIVE FIELD HEIGHT (3.158)°
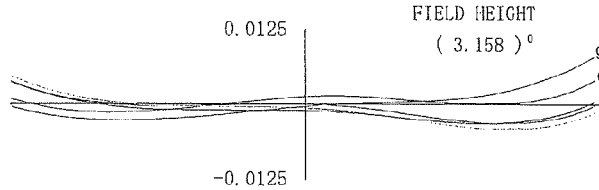 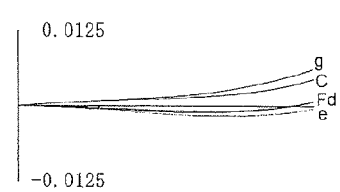
0.00 RELATIVE FIELD HEIGHT (0.000)°
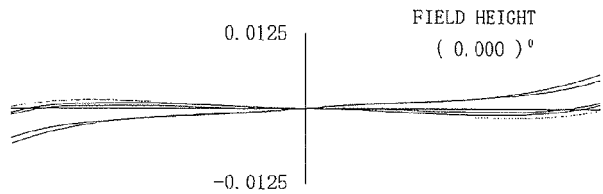 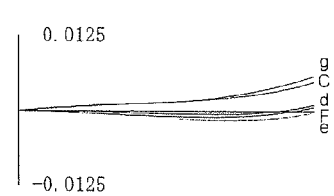

ZOOM LENS AND OPTICAL APPARATUS HAVING THE SAME

This is a continuation of PCT International Application No. PCT/JP2013/002326, filed on Apr. 3, 2013, which is hereby incorporated by reference. This application also claims the benefit of Japanese Patent Application No. 2012-098812, filed in Japan on Apr. 24, 2012, which is hereby incorporated by reference.

TECHNICAL FIELD

The present invention relates to a zoom lens.

TECHNICAL BACKGROUND

Zoom lenses having various specifications have been proposed as zoom lenses included in film cameras and also in electronic image apparatuses such as video cameras and digital still cameras. For example, a zoom lens, which is constituted by three lens groups of which refractive power arrangement is positive, negative and positive in order from the object side, has been disclosed (e.g. see Patent Document 1).

PRIOR ARTS LIST

Patent Document

Patent Document 1: Japanese Laid-Open Patent Publication No. S64-79718(A)

SUMMARY OF THE INVENTION

Problems to be Solved by the Invention

Lately excellent image forming performance (particularly low color shifting and less flares) is demanded to support the advancement of imaging technology, including finer pixel pitches and higher sensitivity of picture elements. In the area of super-telephoto zoom lens, however, it has been extremely difficult to simultaneously implement image forming performance and downsizing.

With the foregoing in view, it is an object of the present invention to provide a compact and high performance zoom lens while achieving good image forming performance in the super-telephoto area, and an optical apparatus having this zoom lens.

Means to Solve the Problems

To achieve this object, a first aspect of the present invention provides a zoom lens having, in order from an object: a first lens group having positive refractive power; a second lens group having negative refractive power; and a third lens group having positive refractive power. The first lens group and the third lens group respectively move toward the object upon zooming from a wide-angle end state to a telephoto end state. The first lens group includes a diffraction optical element in which two optical elements, constituted by optical materials of which refractive index difference at the d-line is 0.45 or less, are cemented, and a diffraction optical surface on which diffraction grating grooves are formed exists on the interface of the two optical elements. The zoom lens satisfies the following conditional expression.

$$0.05 < \phi 1/ft < 1.00$$

$$3.0 < \phi d/y < 10.0$$

where $\phi 1$ denotes an effective diameter of an optical surface closest to the object in the first lens group, ft denotes a focal length of the zoom lens in the telephoto end state, $\phi d$ denotes an effective diameter of the diffraction optical surface, and y denotes a maximum image height of the zoom lens.

A second aspect of the present invention provides an optical apparatus (e.g. mirrorless camera 1 according to the embodiment) having the zoom lens of the above aspect.

Advantageous Effects of the Invention

The present invention can provide a compact and high performance zoom lens while implementing good image forming performance in the super-telephoto area, and an optical apparatus having this zoom lens.

BRIEF DESCRIPTION OF THE DRAWINGS

FIG. 5 is a set of graphs showing lateral aberrations of the zoom lens according to Example 1 upon focusing on infinity in the telephoto end state;

DESCRIPTION OF THE EMBODIMENTS

Embodiments of the present invention will now be described with reference to the drawings. As FIG. 1 shows, a zoom lens ZL according to this embodiment includes, in order from an object: a first lens group G1 having positive refractive power; a second lens group G2 having negative refractive power; and a third lens group G3 having positive refractive power, where the first lens group G1 and the third lens group G3 respectively move toward the object upon zooming from the wide-angle end state to the telephoto end state, the first lens group G1 includes a diffraction optical element DOE in which two optical elements, constituted by optical materials of which refractive index difference at the d-line is 0.45 or less, are cemented, and a diffraction optical surface (corresponding to the optical surface with radius of curvature R8 in FIG. 1) on which diffraction grating grooves are formed, exists on the interface of the two optical elements.

First the feature of a zoom lens having a three-lens group configuration in general will be described. A zoom lens must include at least two lens groups, therefore in the following description, the multi-lens group configuration refers to a lens configuration having three or more lens groups.

In the case of a zoom lens having the three-lens group configuration, higher magnification can be implemented since the number of lens groups that implement zooming increases. Further, if the number of lens groups increases, aberrations generated in each lens group can be more easily equalized, which allows implementing excellent image forming performance. If the last lens group, that is the lens group G3 disposed closest to the image plane is movable, and can move toward the object upon zooming from the wide-angle end state to the telephoto end state, magnification can be more easily increased. Increasing the number of lens groups that can move along the optical axis makes the structure of the lens barrel complicated, but this problem is being solved by recent advancements in lens barrel technique.

Figure 1:
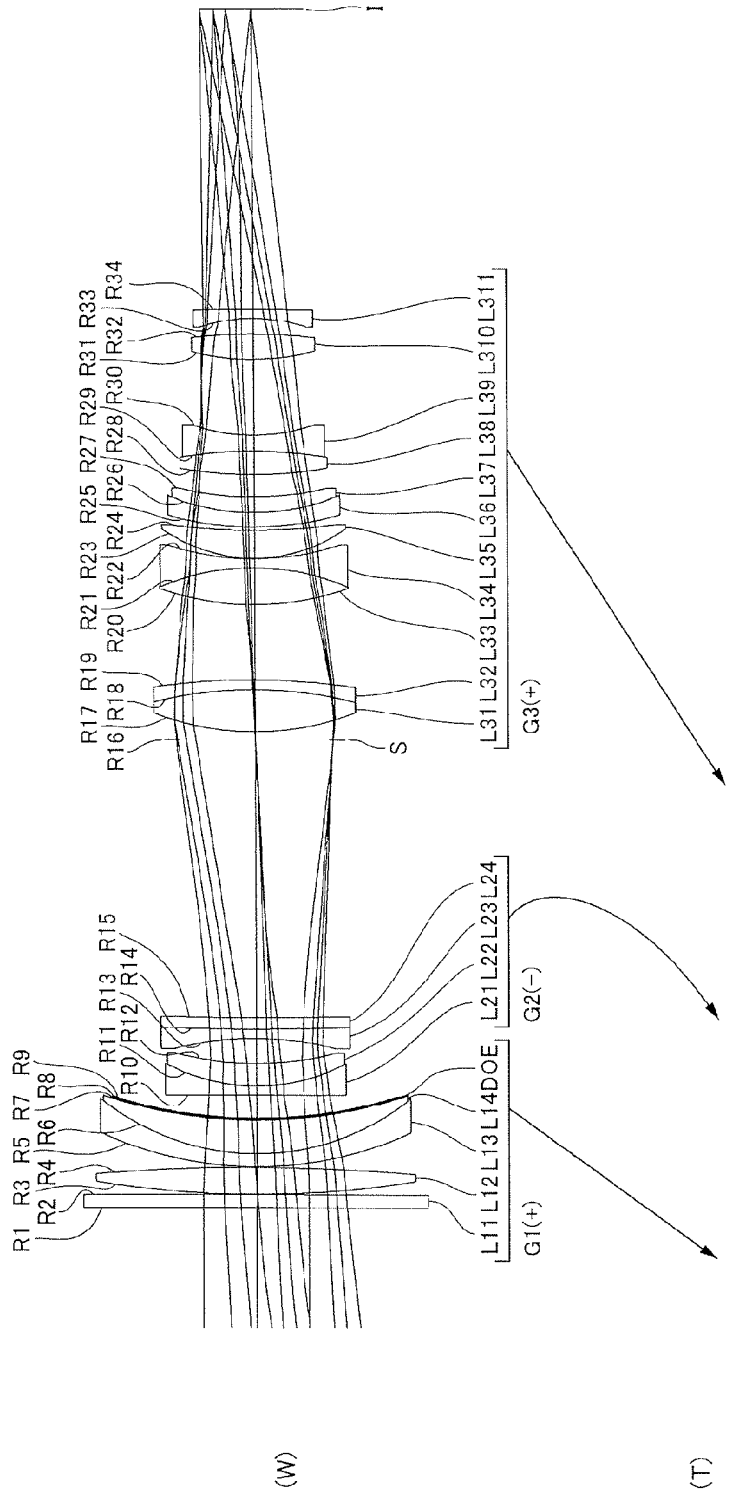
FIG. 1 shows a configuration of a zoom lens according to Example 1 and a zoom locus from a wide-angle end state (W) to a telephoto end state (T)

Based on this technical foundation and background of zoom lenses having a multi-lens group configuration, this embodiment uses the three-lens group configuration arranging positive, negative and positive refractive powers in order from the object, as shown in FIG. 1. In other words, in the case of the zoom lens ZL of this embodiment, flexibility of aberration correction, including the flexibility of the movement of each lens group, is enhanced by increasing the number of constituting lens groups. As a result, a zoom lens having high performance can be implemented with good image forming performance, even in an intermediate focal length state other than the wide-angle end state and the telephoto end state. For example, a high magnification zoom lens, which is suitable for a high resolution digital still camera, can be implemented. Excellent image forming performance can also be implemented when this zoom lens is applied to a photographing lens for filming.

Now the diffraction optical surface will be described. Well known methods for deflecting a ray are refraction and reflection, but diffraction is also known as a third such method. A diffraction optical element is an optical element using the diffraction phenomena of light, and presents a behavior that is different from refraction and reflection. In concrete terms, a diffraction grating and a Fresnel's zone plate have been known (conventionally known). Even in the case of natural light, coherence length is normally several λ (nm), hence if a structure in a wavelength order is created, obvious diffraction phenomena can be generated as a result of the interference of light waves. The surface which plays the function of deflecting a ray like this using a diffraction phenomenon is called "diffraction optical surface". An optical element having such as surface is normally called a "diffraction optical element".

The diffraction optical surface has the nature of having a negative dispersion value while the refractive power is positive, which is very effective for correcting chromatic aberration. Therefore good chromatic aberration correction at a level which normal glass cannot reach becomes possible, or good chromatic aberration which can be implemented only by using an expensive special low dispersion glass becomes possible.

Therefore in the zoom lens ZL according to this embodiment, a diffraction optical surface that has a function to deflect a ray, utilizing the diffracting phenomena of diffraction grating or Fresnel's zone plate, is created on the surface of an optical member, such as glass or plastic, so that good optical performance is acquired by this function.

It is preferable to make the angle of the ray that passes through the diffraction optical surface of the optical system small. Because as the angle of the ray that passes through the diffraction optical surface increases, flares (blazed light that exceeds a predetermined order and becomes harmful light that reaches a projection surface) are more easily generated from the wall portions (step portions) of the grating on the diffraction optical surface, diminishing image quality. In the case of the zoom lens ZL according to this embodiment, it is preferable that the angle of a ray which passes through the diffraction optical surface is 30° or less, in order to acquire a good image with receiving virtually no influence from a flare. As long as this condition is satisfied, the diffraction optical surface can be disposed at any position of the zoom lens ZL.

As mentioned above, the zoom lens ZL according to this embodiment is intended to achieve good image forming performance in the super-telephoto area by effectively using a diffraction optical element for a high magnification zoom lens having a multi-lens group configuration.

The conditions to configure the zoom lens ZL according to this embodiment will now be described in greater detail.

The zoom lens ZL according to this embodiment has the above mentioned configuration, and is configured to satisfy the following conditional expressions (1) and (2).

$$0.05 < \phi 1/ft < 1.00 \qquad (1)$$

$$3.0 < \phi d/y < 10.0 \qquad (2)$$

where φ1 denotes an effective diameter of an optical surface closest to the object in the first lens group G1, ft denotes a focal length of the zoom lens ZL in the telephoto end state, φd denotes an effective diameter of the diffraction optical surface, and y denotes a maximum image height of the zoom lens ZL.

The conditional expression (1) specifies an appropriate range of the effective diameter φ1 of the optical surface closest to the object in the first lens group G1 when normalized by the focal length ft of the zoom lens ZL in the telephoto end state. If the upper limit value of the conditional expression (1) is exceeded, the effective diameter φ1 of the optical surface closest to the object in the first lens group G1 becomes too long, which increases the size and weight of the optical system as a whole. Moreover, coma Aberration is more easily generated in the telephone end state, and stray light more easily enters, which deteriorates the image quality. If the lower limit value of the conditional expression (1) is not reached, the effective diameter φ1 of the optical surface closest to the object in the first lens group G1 becomes too short, which makes it difficult to receive sufficient peripheral light in the wide-angle end state. Further, the focal length ft of the zoom lens ZL in the telephoto end state becomes too long with respect to the effective diameter φ1, hence not only does the total length of the optical system become long but also the longitudinal chromatic aberration is increased, which is not desirable. Furthermore, the F number increases in the telephoto end state, which may make it difficult to secure sufficient brightness for photographing.

To demonstrate the effect of this embodiment with certainty, it is preferable that the upper limit value of the conditional expression (1) is 0.40. To demonstrate the effect of this embodiment with certainty, it is preferable that the lower limit value of the conditional expression (1) is 0.08.

The conditional expression (2) specifies an appropriate range of the effect diameter φd of the diffraction optical surface when normalized by the maximum image height y of the zoom lens ZL. If the upper limit value of the conditional expression (2) is exceeded, the effective diameter φd of the diffraction optical surface becomes too long, which increases the size and weight of the diffraction optical element DOE. Further, the number of zones on the diffraction optical surface increases, which makes manufacturing difficult. Moreover, correction of chromatic aberrations at a high order (especially spherical aberration and color difference thereof) becomes difficult. If the lower limit value of the conditional expression (2) is not reached, the effective diameter φd of the diffraction optical surface becomes too small, and sufficient correction of chromatic aberration in the telephoto end state becomes difficult, and as a result, good image quality cannot be acquired. Further, the minimum pitch of the diffraction grating grooves formed on the diffraction optical surface becomes small, which makes manufacturing difficult.

To demonstrate the effect of this embodiment with certainty, it is preferable that the upper limit value of the conditional expression (2) is 7.0. To demonstrate the effect of this embodiment with certainty, it is preferable that the lower limit value of the conditional expression (2) is 3.5.

In the zoom lens ZL according to this embodiment, it is preferable that the following conditional expression (3) is satisfied.

$$0.50 < \{f1+(-f2)+f3\}/ft < 1.50 \quad (3)$$

where f1 denotes a focal length of the first lens group G1, f2 denotes a focal length of the second lens group G2, and f3 denotes a focal length of the third lens group G3.

The conditional expression (3) specifies an appropriate range of each focal length f1, f2 and f3 of the first lens group G1, the second lens group G2, and the third lens group G3, that is a range of appropriate power distribution. If the upper limit value of the conditional expression (3) is exceeded, the total of each focal length f1, f2 and f3 of the first lens group G1, the second lens group G2 and the third lens group G3 becomes too large, which increases the length of the optical system as a whole. Moreover, the spherical aberration in the telephoto end state increases too much, which makes it difficult to implement good image quality. If the lower limit value of the conditional expression (3) is not reached, the total of each focal length f1, f2 and f3 of the first lens group G1, the second lens group G2, and the third lens group G3 becomes too small, and the power of the second lens group G2, which plays a major role in zooming, becomes too strong, and the Petzval sum of the optical system as a whole increases to the negative side, which tends to diminish the flatness of the image plane.

To demonstrate the effect of the embodiment with certainty, it is preferable that the upper limit value of the conditional expression (3) is 1.20. To demonstrate the effect of the embodiment to the maximum, it is preferable that the upper limit value of the conditional expression (3) is 1.10. To demonstrate the effect of the embodiment with certainty, it is preferable that the lower limit value of the conditional expression (3) is 0.65. To demonstrate the effect of this embodiment to the maximum, it is preferable that the lower limit value of the conditional expression (3) is 0.70.

In the zoom lens ZL according to this embodiment, it is preferable that the optical materials of the two optical elements constituting the diffraction optical element DOE are resin, and the following conditional expressions (4) and (5) are satisfied.

$$20.0 < fd/f1 < 700.0 \quad (4)$$

$$0.002 < p/fw < 0.150 \quad (5)$$

where fd denotes a focal length of the diffraction optical element DOE, f1 denotes a focal length of the first lens group G1, p denotes a minimum pitch of the diffraction grating grooves formed on the diffraction optical surface, and fw denotes a focal length of the zoom lens ZL in the wide-angle end state.

The conditional expression (4) specifies an appropriate range of the power of the diffraction optical element DOE disposed in the first lens group G1. If the upper limit value of the conditional expression (4) is exceeded, the focal length fd of the diffraction optical element DOE becomes too long, which diminishes the effect of the diffraction optical surface, and makes it difficult to satisfactorily correct chromatic aberration in the telephoto end state. If the lower limit value of the conditional expression (4) is not reached, the focal length fd of the diffraction optical element DOE becomes too short, which makes longitudinal chromatic aberration of the long wavelength in the telephoto end state became under-corrected, and makes it difficult to sufficiently correct chromatic aberration, making it impossible to implement good image quality. Furthermore, the minimum pitch of the diffraction grating groves formed on the diffraction optical surface becomes too small, which makes manufacturing difficult.

To demonstrate the effect of this embodiment with certainty, it is preferable that the upper limit value of the conditional expression (4) is 250.0. To demonstrate the effect of this embodiment with certainty, it is preferable that the lower limit value of the conditional expression (4) is 80.0.

The conditional expression (5) specifies an appropriate range of the minimum pitch p of the diffraction grating grooves formed on the diffraction optical surface of the diffraction optical element DOE when normalized by the focal length fw of the zoom lens ZL in the wide angle end state. If the upper limit value of the conditional expression (5) is exceeded, the minimum pitch of the diffraction grating groves formed on the diffraction optical surface becomes too large, which makes it difficult to sufficiently correct Chromatic aberration. If the lower limit value of the conditional expression (5) is not reached, the minimum pitch of the diffraction grating grooves formed on the diffraction optical surface becomes too small, which makes longitudinal chromatic aberration of a long wavelength in the telephoto end state under-corrected, and makes it difficult to sufficiently correct chromatic aberration, making it impossible to implement good image quality. Furthermore, the minimum pitch of the diffraction grating grooves formed on the diffraction optical surface becomes too small, which makes manufacturing difficult.

To demonstrate the effect of this embodiment with certainty, it is preferable that the upper limit value of the conditional expression (5) is 0.040. To demonstrate the effect of this embodiment with certainty, it is preferable that the lower limit value of the conditional expression (5) is 0.070.

In the zoom lens ZL according to this embodiment, it is preferable that the following conditional expressions (6) and (7) are satisfied.

$$0.0001 < \Delta 2(g\sim C)/(-f2) < 0.0010 \qquad (6)$$

$$0.0001 < |\Delta 3(g\sim C)/f3| < 0.0010 \qquad (7)$$

where $\Delta 2$ (g~C) denotes a value of the longitudinal Chromatic aberration (endless conjugate) of the second lens group G2 alone, f2 denotes a focal length of the second lens group G2, $\Delta 3$ (g~C) denotes a value of the longitudinal chromatic aberration (endless conjugate) of the third lens group G3 alone, and f3 denotes a focal length of the third lens group G3.

The conditional expression (6) specifies an appropriate range of the value of the longitudinal chromatic aberration (endless conjugate) $\Delta 2$ (g~C) of the second lens group G2 alone. If the upper limit value of the conditional expression (6) is exceeded, the Chromatic aberration that generates in the second lens group G2 alone increases too much, and the fluctuation of chromatic aberration, longitudinal chromatic aberration in particular, increases upon zooming, making it impossible to implement good image quality. If the lower limit value of the conditional expression (6) is not reached, the number of lenses that constitute the second lens group G2 must be increased, which increases the size and weight of the optical system.

To demonstrate the effect of this embodiment with certainty, it is preferable that the upper limit value of the conditional expression (6) is 0.0015. To demonstrate the effect of this embodiment with certainty, it is preferable that the lower limit value of the conditional expression (6) is 0.0002.

The conditional expression (7) specifies an appropriate range of the value of the longitudinal chromatic aberration (endless conjugate) $\Delta 3$ (g~C) of the third lens group G3 alone. If the upper limit value of the conditional expression (7) is exceeded, the Chromatic aberration that generates in the third lens group G3 alone increases too much, and fluctuation of the chromatic aberration, longitudinal chromatic aberration in particular, increases upon zooming, making it impossible to implement good image quality. If the lower limit value of the conditional expression (7) is not reached, the number of lenses near the aperture stop in particular increases in the third lens group G3, which increases the size and weight of the optical system.

To demonstrate the effect of this embodiment with certainty, it is preferable that the upper limit value of the conditional expression (7) is 0.0015. To demonstrate the effect of this embodiment with certainty, it is preferable that the lower limit value of the conditional expression (7) is 0.0002.

In the zoom lens ZL according to this embodiment, it is preferable that the following conditional expression (8) is satisfied.

$$0.005 < (hd)/p < 0.800 \qquad (8)$$

where (hd) denotes a grating height of the diffraction grating grooves formed on the diffraction optical surface, and p denotes a minimum pitch of the diffraction grating grooves formed on the diffraction optical surface.

The conditional expression (8) specifies an appropriate range of the ratio of the height (hd) and the minimum pitch p of the diffraction grating grooves formed on the diffraction optical surface, that is the aspect ratio, of the diffraction optical element DOE. The conditional expression (8) is important for manufacturing and as a measure to decrease flares. If the upper limit value of the conditional expression (8) is exceeded, the aspect ratio becomes too high, which makes manufacturing difficult. Moreover, the diffraction flare generation amount increases, which makes it difficult to implement good image forming performance. If the lower limit value of the conditional expression (8) is not reached, on the other hand, the pitch of the diffraction grating grooves formed on the diffraction optical surface becomes too large, which makes it difficult to provide a sufficient achromatic function.

To demonstrate the effect of this embodiment with certainty, it is preferable that the upper limit value of the conditional expression (8) is 0.080. To demonstrate the effect of this embodiment with certainty, it is preferable that the lower limit value of the conditional expression (8) is 0.010.

In the zoom lens ZL according to this embodiment, it is preferable that the following conditional expression (9) is satisfied.

$$0.05 < \Delta N < 0.45 \qquad (9)$$

where $\Delta N$ denotes a difference of refractive indexes (at the d-line) of the optical materials used for the two lens elements constituting the cemented lens (if there are a plurality of cemented lenses, the one closest to the object) in the first lens group G1.

The conditional expression (9) specifies an appropriate range of the difference of the refractive indexes $\Delta N$ of the optical materials used for the two lens element constituting the cemented lens in the first lens group G1. If the upper limit value of the conditional expression (9) is exceeded, the difference of the refractive indexes $\Delta N$ becomes too large, and the reflection light on the cemented surface becomes strong, which easily generates ghosts and flares. Further, curvature of field tends to increase, and flatness of the image plane may diminish. If the lower limit value of the conditional expression (9) is not reached, the difference of the refractive indexes of the optical materials of the two lens elements becomes small, and both the spherical aberration and curvature of field in the telephoto end state tend to shift to the negative side, which is not desirable.

To demonstrate the effect of this embodiment with certainty, it is preferable that the upper limit value of the conditional expression (9) is 0.20. To demonstrate the effect of this embodiment with certainty, it is preferable that the lower limit value of the conditional expression (9) is 0.04.

In the zoom lens ZL according to this embodiment, it is preferable that the following conditional expression (10) is satisfied.

$$0.001 < d1/fw < 0.100 \qquad (10)$$

where d1 denotes a thickness (on the optical axis) of the optical element constituted by an optical material having a relatively low refractive index out of the optical elements constituting the diffraction optical element DOE in the first lens group G1, and fw denotes a focal length of the zoom lens ZL in the wide-angle end state.

The conditional expression (10) specifies an appropriate range of the thickness d1 (on the optical axis) of the optical element constituted by the optical material on the low refractive index side in the diffraction optical element DOE in the first lens group G1 when normalized by the focal length fw of the zoom lens ZL in the wide-angle end state. If the upper limit value of the conditional expression (10) is exceeded, the thickness d1 of the optical element on the optical axis becomes too large, which increases the light absorption on the shorter wavelength side, and deteriorates the transmittance of the optical system as a whole on the shorter wavelength side. If the lower limit value of the conditional expression (10) is not reached, the thickness d1 of the optical element on the optical axis becomes too small, which makes it difficult to mold the diffraction optical element DOE.

To demonstrate the effect of this embodiment with certainty, it is preferable that the upper limit value of the conditional expression (10) is 0.030. To demonstrate the effect of this embodiment with certainty, it is preferable that the lower limit value of the conditional expression (10) is 0.001.

When lenses are actually configured, it is preferable to further satisfy the following configuration requirements.

In the zoom lens ZL according to this embodiment, it is preferable that the first lens group G1 includes at least one positive lens constituted by an optical material of which partial dispersion ratio is Pgf<0.58 and of which Abbe number at the d-line is vd<75, and at least one negative lens constituted by an optical material of which partial dispersion ratio is Pgf>0.59. By this configuration, sufficient achromatism by the first lens group G1 alone, as well as the diffraction optical surface, becomes possible.

In this embodiment, the partial dispersion ratio Pgf is defined as Pgf=(ng−nF)/(nF−nC), where ng, nF and nC denote the refractive indexes of the optical material of the lens at the g-line, F-line and C-line respectively. The Abbe number vd at the d-line is defined as vd=(nd−1)/(nF−nC), where nd, nF and nC denote the refractive indexes of the optical material of the lens at the d-line, F-line and C-line respectively.

In the zoom lens ZL according to this embodiment, it is preferable that the second lens group G2 includes at least one lens constituted by an optical material of which partial dispersion ratio is Pgf>0.60 and of which refractive index at the d-line is nd>1.55. If this configuration is used, sufficient achromatism by the second lens group G2 alone becomes possible.

In the zoom lens ZL according to this embodiment, it is preferable that the third lens group G3 includes at least two lenses constituted by an optical material of which partial dispersion ratio is Pgf>0.60 and of which refractive index at the d-line is nd>1.55, and at least one negative lens constituted by KzF (optical material which is high refraction but has low dispersion (dispersion from blue to purple is short)). If this configuration is used, sufficient achromatism by the third lens group G3 alone becomes possible.

In the zoom lens ZL according to this embodiment, the diffraction optical surface may be disposed anywhere in the zoom lens ZL only if the angle of the ray which passes through the first lens group G1 is 5° or less in the telephoto end state. By this configuration, the angle of the ray which passes through the diffraction optical surface is kept low, whereby a good image can be implemented without being subject to the influence of flares generated on the diffraction optical surface. In this case, the lens on which the diffraction optical surface is disposed may be a positive lens or a negative lens. However, in the zoom lens ZL according to this embodiment, it is preferable that the first lens group G1 is a cemented lens constituted by a positive lens and a negative lens, in order to correct the secondary spectrum, which cannot be sufficiently corrected by the diffraction optical surface alone.

In the zoom lens ZL according to this embodiment, focusing on an object at a short distance may be performed by moving the first lens group G1 toward the object (front focus method). It is preferable that the image forming magnification of the second lens group G2 does not exceed the actual size (−1 times) upon zooming from the wide-angle end state to the telephoto end state, in order to implement the inner focus.

In the zoom lens ZL according to this embodiment, it is preferable that the second lens group G2 includes one positive lens for satisfactorily correcting chromatic aberration. Further, it is more preferable that the second lens group G2 includes at least two negative lenses.

In the zoom lens ZL according to this embodiment, it is preferable that the third lens group G3 includes a positive lens or a cemented lens of a positive lens and a negative lens near the aperture stop to satisfactorily correct chromatic aberration. Further, it is more preferable that a cemented lens of a positive biconvex lens and a negative lens is disposed at least in two locations in the third lens group G3.

When the diffraction optical surface is actually formed on the lens in the zoom lens ZL according to this embodiment, it is preferable that the diffraction optical surface is created to have a rotational symmetric structure (grating structure) with respect to the optical axis, as in the case of the Fresnel's zone plate, to make manufacturing easier. In this case, the lens can be created by precision grinding or by a glass mold, just like the case of an ordinary aspherical lens. Furthermore, a thin resin layer may be formed on the lens surface, so that the grating structure is formed on this resin layer. The diffraction grating is not limited to a simple single layer structure, such as a kinoform, but may have a multi-layer structure where a plurality of grating structures are layered. If the diffraction grating having a multilayer structure is used, the wavelength characteristic and angle of view characteristic of the diffraction efficiency can be further improved, which is advantageous.

The zoom lens ZL according to this embodiment may constitute a vibration-isolating lens system, in combination with a blur detection unit that detects lens blurring, a blur controller that determines an appropriate blur correction amount based on the signal from the blur detection unit and a signal from a control unit for controlling the camera operation sequence, and a drive mechanism that moves the vibration-isolating lens group based on the blur correction amount determined by the blur controller. Needless to say, even better optical performance can be implemented by using a refractive index distribution lens, an aspherical lens or the like for each lens constituting the zoom lens ZL according to this embodiment.

Figure 11:
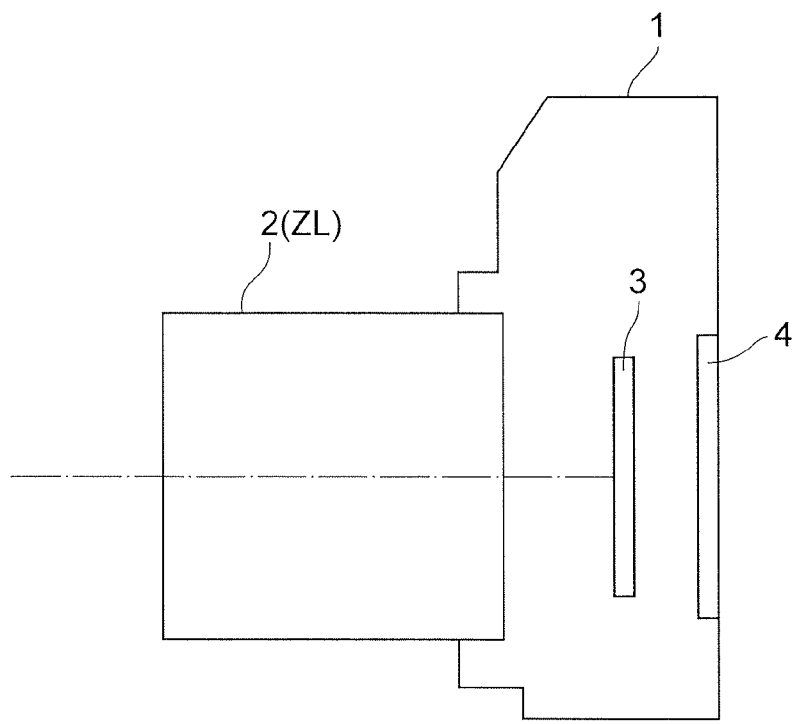
FIG. 11 is a cross-sectional view depicting a configuration of a camera (optical apparatus) according to this embodiment.

FIG. 11 is a cross-sectional view of a lens exchange type mirrorless camera 1 (hereafter simply called "camera") as an optical apparatus having the above mentioned zoom lens ZL. In this camera 1, the light from an object (not illustrated) is collected by an image capturing lens 2 (zoom lens ZL) and forms an object image on an imaging surface of an imaging unit 3 via an OLPF (Optical Low-Pass Filter), which is not illustrated. The object image is photo-electric converted by a photoelectric conversion element disposed in the imaging unit 3, and an image of the object is generated. This image is displayed on an EVF (Electronic View Finder) 4 disposed in the camera 1. Thereby the user can see the object image via the EVE 4.

If the user presses a release button (not illustrated), the photo-electric converted image is stored in memory (not illustrated) by the imaging unit 3. Thus the user can photograph the object using this camera 1.

The camera 1 may hold a removable image capturing lens 2 (zoom lens ZL) or may be integrated with the image capturing lens 2 (zoom lens ZL).

Here the case of the mirrorless camera is shown as an optical apparatus having the image capturing lens 2 (zoom lens ZL), but the present invention is not limited to this, but may be a single lens reflex type camera which has a quick return mirror on the camera body, and the object image can be viewed via the finder optical system.

As each example described later clarifies, the zoom lens ZL according to this embodiment included in this camera 1 as the image capturing lens 2 implements a compact and high performance zoom lens while achieving good image forming performance in the super-telephoto area, because of its characteristic lens configuration. Therefore this camera 1 can implement a compact and high performance optical apparatus while achieving good image forming performance in the super-telephoto area.

EXAMPLES

Each example of this embodiment will now be described with reference to the drawings. Table 1 and Table 2 shown below list the data of Example 1 and Example 2.

In each example, the aberration characteristics are calculated with respect to the C-line (wavelength: 656.2730 nm), the d-line (wavelength: 587.5620 nm), the e-line (wavelength: 546.0740 nm) and the F-line (wavelength: 486.1330 nm).

In [Lens Data] in each table, the surface number is the sequential number of the optical surface counted from the object side in the light traveling direction, R denotes the radius of curvature of each optical surface, D denotes a surface distance, which is a distance from each optical surface to the next optical surface (or image plane) on the optical axis, nC denotes a refractive index of the lens material at the C-line, nd denotes a refractive index of the lens material at the d-line, ne denotes a refractive index of the lens material at the e-line, nF denotes a refractive index of the lens material at the F-line, and ng denotes a refractive index of the lens material at the g-line. The object surface indicates the surface of the object, (Variable) indicates the variable surface distance, "∞" in the radius of curvature R indicates a plane or an aperture, (Stop) indicates an aperture stop S, and the image plane indicates the image plane I. The refractive index of air "1.000000" is omitted. If the optical surface is aspherical, "★" is attached to the surface number, and the paraxial radius of curvature is shown in the column of the radius of curvature R. If the optical surface is a diffraction optical surface, "★★" is attached to the surface number.

In [Aspherical Data] in each table, a form of the aspherical surface shown in [Lens Data] is indicated by the following expression (a). Here y denotes a height in the direction perpendicular to the optical axis, S(y) denotes a distance at the height y in the optical axis direction from a tangential plane at a vertex of the aspherical surface to each aspherical surface (sag), r denotes a reference radius of curvature (vertex radius of curvature), κ denotes a conical coefficient, Ai denotes an aspherical coefficient in the i-th order. "E-n" indicates "×10$^{-n}$". For example, 1.234E-05=1.234×10$^{-5}$.

$$S(y)=(y^2/r)/[1+\{1-(\kappa+1)\times y^2/r^2\}^{1/2}]+A4\times y^4+A6\times y^6+A8\times y^8+A10\times y^{10} \quad (a)$$

In [Diffusion optical surface data], the form of the diffraction optical surface shown in [Lens Data] is indicated by the data of the phase function method, that is, the following expression (b). In other words, for the diffraction optical surface, phase conversion of the wave surface is performed based on expression (b). φ denotes a phase function, h denotes a distance in the diameter direction, Ci denotes a coefficient in the i-th order, and $\lambda_d$ denotes a reference wavelength (d-line). Here the diffraction optical surface is formed to be rotationally symmetric with respect to the optical axis. For details on the phase function method, see "Introduction to diffraction optical elements (Expanded and Revised Edition, 2007, under supervision of The Japan Society of Applied Physics and The Optical Society of Japan).

$$\phi(h)=(2\pi/\lambda_d)\times(C1\times h^2+C2\times h^4+C3\times h^6+C4\times h^4) \quad (b)$$

In [General Data] in each table, f denotes a focal length, FNo denotes an F number, ω denotes a half angle of view, Y denotes an image height, and TL denotes a total lens length.

In [Zooming Data] in each table, Di (i is an integer) denotes a variable distance between the i-th surface and the (i+1)th surface in each state of the wide-angle end state and the telephoto end state, and Bf denotes a distance from the image side surface of the optical member disposed closest to the image plane to the paraxial image plane. Aperture diameter denotes the diaphragm diameter of the aperture stop S.

In [Zoom Lens Group Data] in each table, G denotes a group number, "First surface of group" indicates a surface number of the surface closest to the object in each lens group, and "Group focal length" indicates a focal length of each lens group.

In [Conditional Expression] in each table, a value corresponding to each conditional expression (1) to (10) is shown.

In all the data values herein below, "mm" is normally used as the unit of the described focal length, radius of curvature, surface distance and other lengths if not otherwise specified, but the unit is not limited to "mm", and another appropriate unit may be used, since an equivalent optical performance is obtained even if the optical system is proportionally expanded or proportionally reduced.

This description on a table is the same for all the examples, and is therefore omitted herein below.

Example 1

Example 1 will be described with reference to FIG. 1 to FIG. 5 and Table 1. FIG. 1 shows a configuration of a zoom lens ZL (ZL1) according to Example 1, and a zoom locus from a wide-angle end state (W) to a telephoto end state (T). As FIG. 1 shows, the zoom lens ZL1 according to Example 1 includes, in order from an object, a first lens group G1 having positive refractive power, a second lens group G2 having negative refractive power, an aperture stop S used for adjusting the quantity of light, and a third lens group G3 having positive refractive power. In FIG. 1, the image plane is denoted with the reference character I.

The first lens group G1 includes, in order from the object: a plane parallel plate L11; a positive biconvex lens L12; and a cemented lens of a negative meniscus lens L13 having a convex surface facing the objet, a positive meniscus lens L14 having a convex surface facing the object, and a multilayer diffraction optical element DOE. The diffraction optical element DOE is formed by cementing two optical elements constituted by resin materials of which difference of the refractive indexes at the d-line is 0.45 or less (see Table 1, described later), and a diffraction optical surface (corresponding to the optical surface of which radius of curvature is R8 in FIG. 1), on which diffraction grating grooves are formed, is created on the interface of the two optical elements.

The second lens group G2 includes, in order from the Object: a cemented lens of a negative meniscus lens L21 having a convex surface facing the object and a positive meniscus lens L22 having a convex surface facing the object; and a cemented lens of a negative biconcave lens L23 and a positive meniscus lens L24 having a convex surface facing the object.

The third lens group G3 includes, in order from the object: a cemented lens of a positive biconvex lens L31 and a negative meniscus lens L32 having a concave surface facing the object; a cemented lens of a positive biconvex lens L33 and a negative biconcave lens L34; a positive meniscus lens L35 having a convex surface facing the object; a cemented lens of a negative meniscus lens L36 having a convex surface facing the object and a positive meniscus lens L37 having a convex surface facing the object; a cemented lens of a positive biconvex lens L38 and a negative biconcave lens L39; a positive biconvex lens L310; and a negative meniscus lens L311 having a concave surface facing the object. KzF (optical glass J-KZFH1 made by Hikari Glass Co. Ltd.) is used as the optical material of the negative meniscus lens L32 having a concave surface facing the object and the positive biconvex lens L310.

In the zoom lens ZL1 having this configuration, all three lens groups G1 to G3 move upon zooming from the wide-angle end state (W) to the telephoto end state (T). The first lens group G1 moves toward the object. The second lens group G2 moves toward the image plane first, then moves toward the object. The third lens group G3 moves toward the object. The aperture stop S, which determines brightness, moves toward the object along with the third lens group G3 upon zooming while changing the aperture diameter.

Table 1 shows each data value of Example 1. The surface numbers 1 to 34 in Table 1 correspond to each optical surface with the radius of curvatures R1 to R34 shown in FIG. 1. In Example 1, the surfaces 9 and 23 are aspherical. The diffraction optical surface is formed on the surface 8.

TABLE 1

[Lens Data]

| Surface number Object surface | R ∞ | D | nC | nd | ne | nF | ng |
|---|---|---|---|---|---|---|---|
| 1 | ∞ | 2.0000 | 1.514322 | 1.516800 | 1.518723 | 1.522384 | 1.526703 |
| 2 | ∞ | 0.1000 | | | | | |
| 3 | 162.3021 | 4.1280 | 1.528457 | 1.531717 | 1.534303 | 1.539338 | 1.545469 |
| 4 | −338.8649 | 0.2000 | | | | | |
| 5 | 60.6463 | 1.9473 | 1.787032 | 1.795040 | 1.801581 | 1.814744 | 1.831539 |
| 6 | 39.5506 | 5.2126 | 1.604144 | 1.607380 | 1.609932 | 1.614847 | 1.620706 |
| 7 | 76.6326 | 0.2000 | 1.523300 | 1.527800 | 1.529597 | 1.531500 | 1.539100 |
| **8 | 76.6326 | 0.2000 | 1.553800 | 1.557100 | 1.558402 | 1.559770 | 1.565000 |
| *9 | 76.6327 | D9 (Variable) | | | | | |
| 10 | 1971.1306 | 1.5000 | 1.590540 | 1.593190 | 1.595274 | 1.599276 | 1.604028 |
| 11 | 31.1213 | 3.5000 | 1.836491 | 1.846660 | 1.855042 | 1.872101 | 1.894191 |
| 12 | 49.7440 | 3.9343 | | | | | |
| 13 | −50.6124 | 1.4000 | 1.635061 | 1.638540 | 1.641281 | 1.646570 | 1.652891 |
| 14 | 377.7390 | 1.8271 | 1.715106 | 1.720000 | 1.723915 | 1.731589 | 1.740979 |
| 15 | 433.3623 | D15 (Variable) | | | | | |
| 16 | ∞ | 1.3000 | (aperture stop) | | | | |
| 17 | 45.1408 | 6.5901 | 1.590540 | 1.593190 | 1.595274 | 1.599276 | 1.604028 |
| 18 | −66.8046 | 1.5000 | 1.608532 | 1.612660 | 1.615933 | 1.622312 | 1.630085 |
| 19 | −119.4217 | 11.7923 | | | | | |
| 20 | 46.3036 | 5.6432 | 1.495980 | 1.497820 | 1.499260 | 1.502013 | 1.505265 |
| 21 | −39.4507 | 1.4000 | 1.799015 | 1.806100 | 1.811838 | 1.823245 | 1.837500 |
| 22 | 43.2135 | 0.1000 | | | | | |
| *23 | 24.3525 | 4.3990 | 1.544572 | 1.548141 | 1.550984 | 1.556543 | 1.563348 |
| 24 | 103.2618 | 0.5000 | | | | | |
| 25 | 50.0781 | 2.2260 | 1.733087 | 1.740769 | 1.747057 | 1.759748 | 1.775991 |
| 26 | 35.3167 | 2.5000 | 1.495980 | 1.497820 | 1.499260 | 1.502013 | 1.505265 |
| 27 | 51.5671 | 3.5000 | | | | | |
| 28 | 69.8085 | 3.6512 | 1.787032 | 1.795040 | 1.801581 | 1.814744 | 1.831539 |
| 29 | −72.4518 | 2.5000 | 1.648205 | 1.651597 | 1.654252 | 1.659336 | 1.665371 |
| 30 | 30.7143 | 11.8372 | | | | | |
| 31 | 38.3881 | 4.0000 | 1.608532 | 1.612660 | 1.615933 | 1.622312 | 1.630085 |
| 32 | −89.2924 | 2.4352 | | | | | |
| 33 | −26.7709 | 1.4000 | 1.590540 | 1.593190 | 1.595274 | 1.599276 | 1.604028 |
| 34 | −406.7806 | Bf | | | | | |
| Image plane | ∞ | | | | | | |

[Aspherical Data]

Surface 9

$k = -0.2909$, $A4 = 0.16828E-07$, $A6 = -0.60959E-10$, $A8 = 0.96518E-13$, $A10 = -0.45966E-16$

Surface 23

$k = -0.1789$, $A4 = -0.25247E-05$, $A6 = -0.16008E-08$, $A8 = 0.26705E-11$, $A10 = -0.91305E-14$

TABLE 1-continued

[Diffraction Optical Surface Data]

Surface 8

| C1 = −0.15415E−04, | C2 = 0.39619E−09, | C3 = 0.10787E−10, | C4 = −0.27463E−13 |
|---|---|---|---|

[General Data]

Zoom ratio 4.02759

| | Wide-angle end | Telephoto end |
|---|---|---|
| f | 72.500 | 292.000 |
| FNo | 4.57 | 5.92 |
| ω | 6.445 | 1.607 |
| Y | 8.91 | 8.91 |
| TL | 187.100 | 251.623 |

[Zooming Data]

| Variable distance | Wide-angle end | Telephoto end |
|---|---|---|
| D9 | 3.50000 | 48.34113 |
| D15 | 43.43817 | 1.50000 |
| Bf | 46.73878 | 108.35886 |
| Aperture diameter | 11.90000 | 14.00000 |

[Zoom Lens Group Data]

| Group number | First surface of group | Group focal length |
|---|---|---|
| G1 | 1 | 169.449 |
| G2 | 10 | −44.1401 |
| G3 | 17 | 48.6085 |

[Conditional Expressions]

Φ1 = 48.0
Φd = 41.1
fd = 22815.3
p = 0.859
Δ2(g~C) = 0.0286227
Δ3(g~C) = −0.0256129
(hd) = 0.02005
d1 = 0.2
Conditional expression (1) Φ1/ft = 0.16438
Conditional expression (2) Φd/y = 4.61279
Conditional expression (3) {f1 + (−f2) + f3}/ft = 0.89794
Conditional expression (4) fd/f1 = 134.644
Conditional expression (5) p/fw = 0.01185
Conditional expression (6) Δ2(g~C)/(−f2) = 0.0006485
Conditional expression (7) |Δ3(g~C)/f3| = 0.0005269
Conditional expression (8) (hd)/p = 0.02334
Conditional expression (9) ΔN = 0.14735
Conditional expression (10) d1/fw = 0.00276

As the data in Table 1 shows, the zoom lens ZL1 according to Example 1 satisfies all of the conditional expressions (1) to (10).

As shown in Table 1, in the case of the positive biconvex lens L12 which constitutes the first lens group G1, the partial dispersion ratio is Pgf=0.563 and the Abbe number at the d-line is vd=48.9, in the case of the negative meniscus lens L13 having the convex surface facing the object, the partial dispersion ratio is Pgf=0.606, and in the case of the positive meniscus lens L4 having a convex surface facing the object, the partial dispersion ratio is Pgf=0.547, and the Abbe number at the d-line is vd=56.7. In the case of the positive meniscus lens L22 having a convex surface facing the object, which constitutes the second lens group G2, the partial dispersion ratio is Pgf=0.620, and the refractive index at the d-line is nd=1.846660. In the case of the negative meniscus lens L36 having a convex surface facing the object, which constitutes the third lens group G3, the partial dispersion ratio is Pgf=0.609, and the refractive index at the d-line is nd=1.740769, and in the case of the positive biconvex lens L38, the partial dispersion ratio is Pgf=0.606 and the refractive index at the d-line is nd=1.795040.

Figure 2:
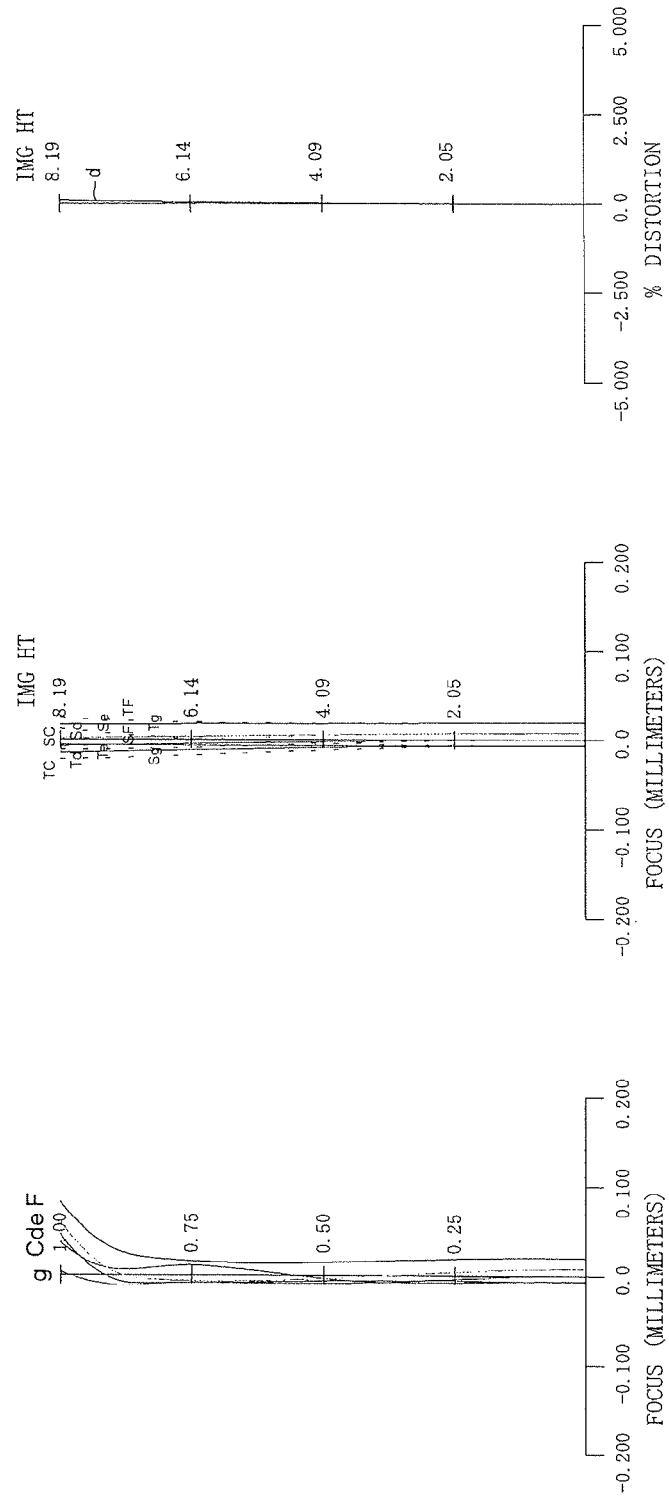
FIG. 2 is a set of graphs showing various aberrations (spherical aberration, astigmatism and distortion in order from the left) of the zoom lens according to Example 1 upon focusing on infinity in the wide-angle end state.
Figure 3:
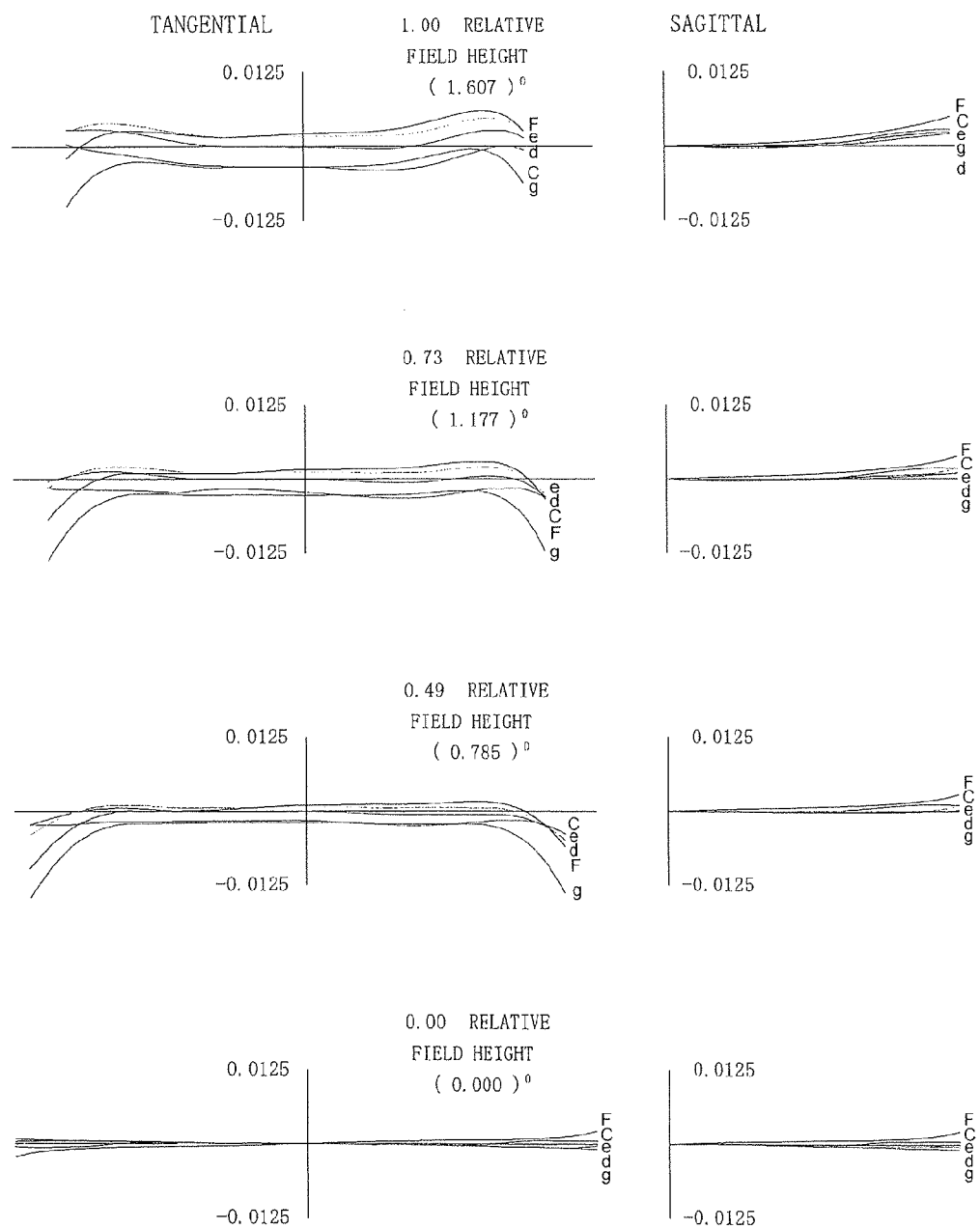
FIG. 3 is a set of graphs showing lateral aberrations of the zoom lens according to Example 1 upon focusing on infinity in the wide-angle end state.
Figure 4:
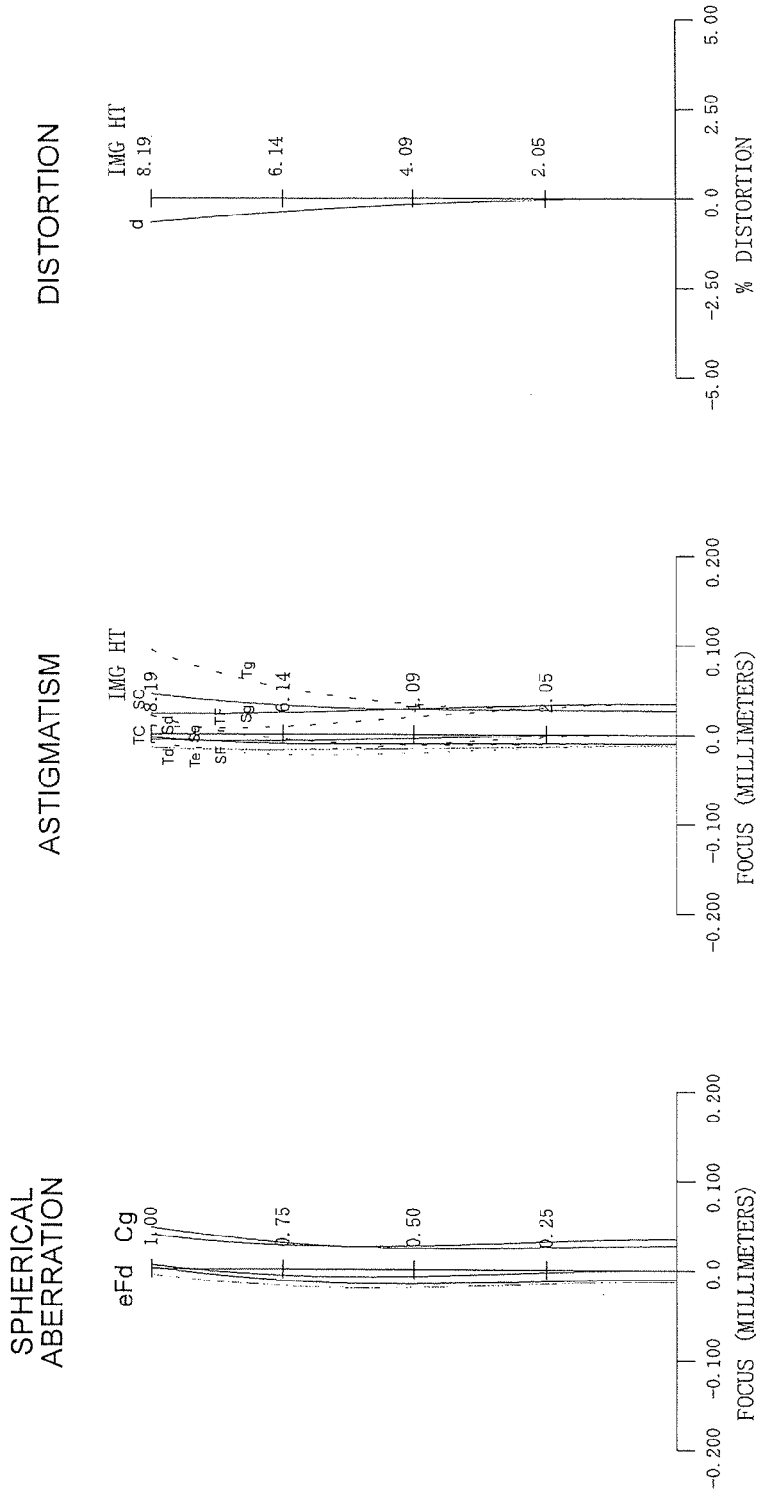
FIG. 4 is a set of graphs showing various aberrations (spherical aberration, astigmatism and distortion in order from the left) of the zoom lens according to Example 1 upon focusing on infinity in the telephoto end state.

FIG. 2 to FIG. 5 are graphs showing various aberrations of the zoom lens ZL1 according to Example 1. Here FIG. 2 is a set of graphs showing various aberrations upon focusing on infinity in the wide-angle end state, FIG. 3 is a set of graphs showing lateral Aberrations upon focusing on infinity in the wide-angle end state, FIG. 4 is a set of graphs showing various aberrations upon focusing on infinity in the telephoto end state, and FIG. 5 is a set of graphs showing lateral aberrations upon focusing on infinity in the telephoto end state.

In each graph showing aberrations, C, d, e, F and g indicate aberrations at the C-line, d-line, e-line, F-line and g-line respectively. In the graph showing spherical aberration, the Abscissa indicates a position on the optical axis (FOCUS), and the ordinate indicates a value of incident height to the pupil when normalized by the maximum height (that is, relative pupil height). In the graph showing astigmatism, the abscissa indicates the position on the optical axis (FOCUS), the ordinate indicates the image height Y (IMG HT), the broken line indicates the tangential image surface, and the solid line indicates the sagittal image surface. In the graph showing distortion, the abscissa indicates a positional shift amount of the focal point (DISTORTION), and the ordinate indicates the image height Y (IMG HT). In the graph showing lateral aberration, the aberration curves of the tangential image surface (TANGENTIAL) and the sagittal image surface (SAGITTAL) are shown in each image height (half angle of view ω). The description on the graphs showing aberrations is the same for other examples, where this description is therefore omitted.

As each graph showing aberrations clarifies, in Example 1, various aberrations are satisfactorily corrected in each focal length state, from the wide-angle end state to the telephoto end state, demonstrating excellent image forming performance.

Example 2

Figure 6:
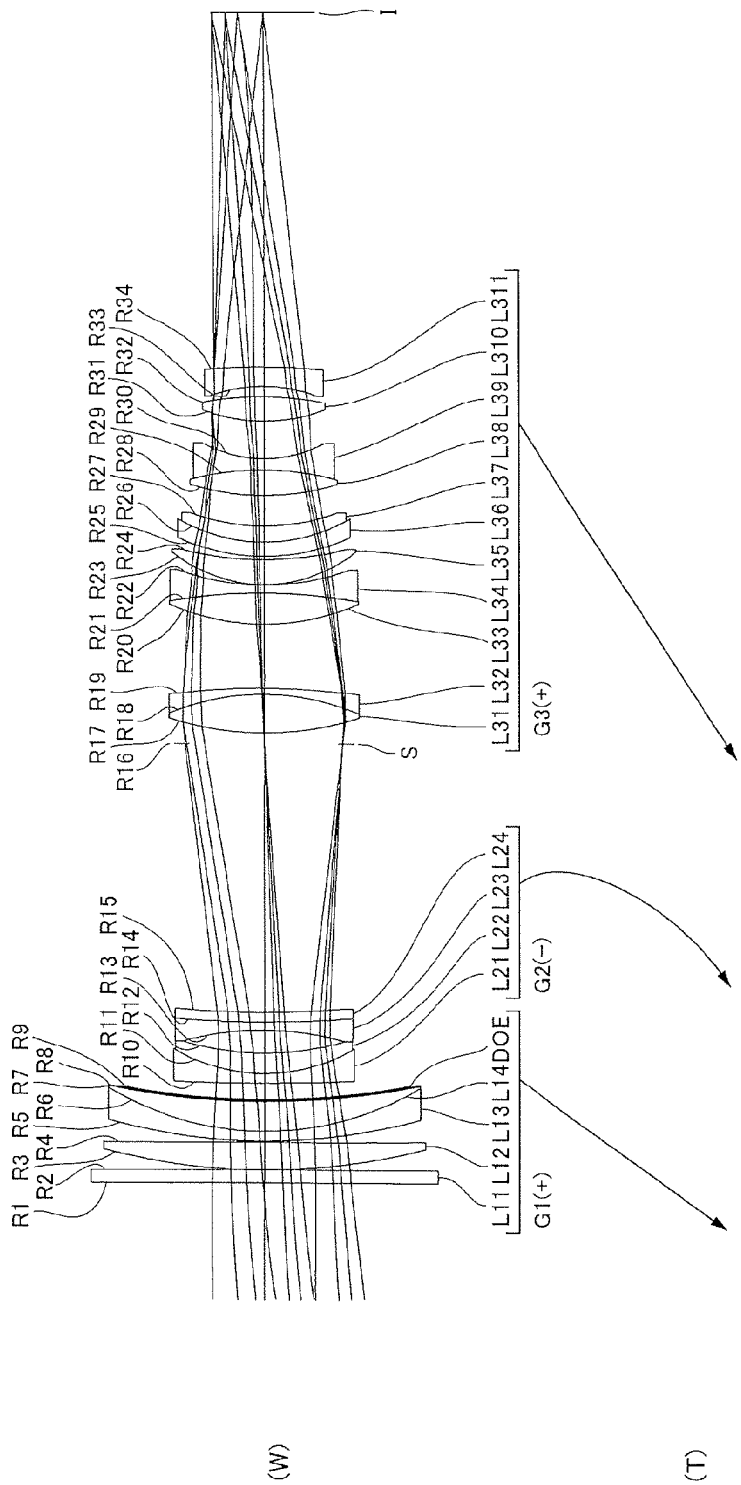
FIG. 6 shows a configuration of a zoom lens according to Example 2 and a zoom locus from a wide-angle end state (W) to a telephoto end state (T)

Example 2 will be described with reference to FIG. 6 to FIG. 10 and Table 2. FIG. 6 shows a configuration of a zoom lens ZL (ZL2) according to Example 2, and a zoom locus from a wide-angle end state (W) to a telephoto end state (T). As FIG. 6 shows, the zoom lens ZL2 according to Example 2 includes, in order from an object, a first lens group G1 having positive refractive power, a second lens group G2 having negative refractive power, an aperture stop S used for adjusting the quantity of light, and a third lens group G3 having positive refractive power. In FIG. 6, the image plane is denoted with the reference character I.

The first lens group G1 includes, in order from the object: a plane parallel plate L11; a positive meniscus lens L12 having a convex surface facing the object; and a cemented lens of a negative meniscus lens L13 having a convex surface facing the object, a positive meniscus lens L14 having a convex surface facing the object, and a multilayer diffraction optical element DOE. The diffraction optical element DOE is formed by cementing two optical elements constituted by resin materials of which difference of refractive indexes at the d-line is 0.45 or less (see Table 2, described later), and a diffraction optical surface (corresponding to the optical surface of which radius of curvature is R8 in FIG. 6), on which diffraction grating grooves are formed, is created on the interface of the two optical elements.

The second lens group G2 includes, in order from the object: a cemented lens of a negative meniscus lens L21 having a convex surface facing the object and a positive meniscus lens L22 having a convex surface facing the object; and a cemented lens of a negative biconcave lens L23 and a positive meniscus lens L24 having a convex surface facing the object.

The third lens group G3 includes, in order from the object: a cemented lens of a positive biconvex lens L31 and a negative meniscus lens L32 having a concave surface facing the object; a cemented lens of a positive biconvex lens L33 and a negative biconcave lens L34; a positive meniscus lens L35 having a convex surface facing the object; a cemented lens of a negative meniscus lens L36 having a convex surface facing the Object and a positive meniscus lens L37 having a convex surface facing the object; a cemented lens of a positive biconvex lens L38 and a negative biconcave lens L39; a positive biconvex lens L310; and a negative meniscus lens L311 having a concave surface facing the object. KzF (optical glass J-KZFH1 made by Hikari Glass Co. Ltd.) is used as the optical material of the negative meniscus lens L32 having a concave surface facing the object.

In the zoom lens ZL2 having this configuration, all three lens groups G1 to G3 move upon zooming from the wide-angle end state (W) to the telephoto end state (T). The first lens group G1 moves toward the object. The second lens group G2 moves toward the image plane first, then moves toward the object. The third lens group G3 moves toward the object. The aperture stop S, which determines brightness, moves toward the object along with the third lens group G3 upon zooming while changing the aperture diameter.

Table 2 shows each data value of Example 2. The surface numbers 1 to 34 in Table 2 correspond to each optical surface with the radius of curvatures R1 to R34 shown in FIG. 6. In Example 2, the surfaces 9 and 23 are aspherical. The diffraction optical surface is formed on the surface 8.

TABLE 2

[Lens Data]

| Surface number Object surface | R ∞ | D | nC | nd | ne | nF | ng |
|---|---|---|---|---|---|---|---|
| 1 | ∞ | 2.0000 | 1.514322 | 1.516800 | 1.518723 | 1.522384 | 1.526703 |
| 2 | ∞ | 0.0840 | | | | | |
| 3 | 104.1487 | 4.2338 | 1.544572 | 1.548141 | 1.550984 | 1.556543 | 1.563348 |
| 4 | 3764.8349 | 0.2000 | | | | | |
| 5 | 92.8285 | 1.5000 | 1.787032 | 1.795040 | 1.801581 | 1.814744 | 1.831539 |
| 6 | 48.4504 | 4.5820 | 1.692974 | 1.696797 | 1.699789 | 1.705523 | 1.712340 |
| 7 | 125.0000 | 0.2000 | 1.523300 | 1.527800 | 1.529597 | 1.531500 | 1.539100 |
| **8 | 125.0000 | 0.2000 | 1.553800 | 1.557100 | 1.558402 | 1.559770 | 1.565000 |
| *9 | 125.0001 | D9 (Variable) | | | | | |
| 10 | 309.0696 | 1.5190 | 1.590540 | 1.593190 | 1.595274 | 1.599276 | 1.604028 |
| 11 | 28.6653 | 3.1912 | 1.836491 | 1.846660 | 1.855042 | 1.872101 | 1.894191 |
| 12 | 46.1966 | 3.5171 | | | | | |
| 13 | −51.6803 | 1.3000 | 1.647491 | 1.651000 | 1.653761 | 1.659080 | 1.665441 |
| 14 | 169.7247 | 1.5000 | 1.647491 | 1.651000 | 1.653761 | 1.659080 | 1.665441 |
| 15 | 162.6744 | D15 (Variable) | | | | | |
| 16 | ∞ | 1.8000 | (aperture stop) | | | | |
| 17 | 51.0889 | 5.9661 | 1.590540 | 1.593190 | 1.595274 | 1.599276 | 1.604028 |
| 18 | −40.0000 | 1.0000 | 1.608532 | 1.612660 | 1.615933 | 1.622312 | 1.630085 |
| 19 | −119.6454 | 10.0000 | | | | | |
| 20 | 37.2350 | 4.8169 | 1.495980 | 1.497820 | 1.499260 | 1.502013 | 1.505265 |

TABLE 2-continued

| | | | | | | | |
|---|---|---|---|---|---|---|---|
| 21 | −92.9900 | 1.3000 | 1.799015 | 1.806100 | 1.811838 | 1.823245 | 1.837500 |
| 22 | 40.8865 | 0.1000 | | | | | |
| *23 | 23.1580 | 3.8452 | 1.544572 | 1.548141 | 1.550984 | 1.556543 | 1.563348 |
| 24 | 55.2954 | 0.5000 | | | | | |
| 25 | 33.5464 | 2.2124 | 1.836491 | 1.846660 | 1.855042 | 1.872101 | 1.894191 |
| 26 | 27.6710 | 2.5000 | 1.495980 | 1.497820 | 1.499260 | 1.502013 | 1.505265 |
| 27 | 34.6220 | 4.6969 | | | | | |
| 28 | 39.0433 | 4.0000 | 1.787032 | 1.795040 | 1.801581 | 1.814744 | 1.831539 |
| 29 | −47.5285 | 1.8101 | 1.798375 | 1.804398 | 1.809222 | 1.818699 | 1.830338 |
| 30 | 20.6959 | 5.8812 | | | | | |
| 31 | 27.3010 | 3.8357 | 1.563387 | 1.567320 | 1.570479 | 1.576673 | 1.584255 |
| 32 | −53.1056 | 1.5429 | | | | | |
| 33 | −25.4384 | 3.0000 | 1.692974 | 1.696797 | 1.699789 | 1.705523 | 1.712340 |
| 34 | −121.6843 | Bf | | | | | |
| Image plane | ∞ | | | | | | |

[Aspherical Data]

Surface 9 k = −0.5050,  A4 = −0.46934E−07,  A6 = −0.27663E−10,  A8 = 0.26292E−13,  A10 = −0.20608E−16

Surface 23 k = −0.1130,  A4 = −0.15158E−05,  A6 = −0.24883E−09,  A8 = 0.71991E−12,  A10 = 0.25938E−15

[Diffraction Optical Surface Data]

Surface 8

C1 = −0.14345E−04,  C2 = −0.64843E−09,  C3 = 0.25512E−11,  C4 = −0.67302E−14

[General Data]

Zoom ratio 4.08386

| | Wide-angle end | Telephoto end |
|---|---|---|
| f | 71.500 | 291.996 |
| FNo | 4.57 | 5.92 |
| ω | 6.535 | 1.607 |
| Y | 8.91 | 8.91 |
| TL | 182.088 | 240.088 |

[Zooming Data]

| Variable distance | Wide-angle end | Telephoto end |
|---|---|---|
| D9 | 2.50000 | 52.27624 |
| D15 | 41.74977 | 0.51657 |
| Bf | 55.00355 | 105.24624 |
| Aperture diameter | 11.90000 | 13.20000 |

[Zoom Lens Group Data]

| Group number | First surface of group | Group focal length |
|---|---|---|
| G1 | 1 | 157.0760 |
| G2 | 10 | −41.6258 |
| G3 | 17 | 47.8666 |

[Conditional Expressions]

$\Phi 1$ = 48.0
$\Phi d$ = 42.4
fd = 29781.1
p = 0.922
$\Delta 2(g \sim C)$ = 0.0196523
$\Delta 3(g \sim C)$ = −0.0221278
hd(blaze wavelength at the d-line) = 0.02005
d1 = 0.2
Conditional expression (1) $\Phi 1/ft$ = 0.16439
Conditional expression (2) $\Phi d/y$ = 4.75870
Conditional expression (3) {f1 + (−f2) + f3}/ft = 0.84442
Conditional expression (4) fd/f1 = 189.597
Conditional expression (5) p/fw = 0.01290
Conditional expression (6) $\Delta 2(g \sim C)/(-f2)$ = 0.0004721
Conditional expression (7) $|\Delta 3(g \sim C)/f3|$ = 0.0004623
Conditional expression (8) (hd)/p = 0.02175
Conditional expression (9) $\Delta N$ = 0.09824
Conditional expression (10) d1/fw = 0.00280

As the data in Table 2 shows, the zoom lens ZL2 according to Example 2 satisfies all of the conditional expressions (1) to (10).

As shown in Table 2, in the case of the positive meniscus lens L12 having a convex surface facing the object, which constitutes the first lens group G1, the partial dispersion ratio is Pgf=0.568, and the Abbe number at the d-line is νd=45.8, in the case of the negative meniscus lens L13 having a convex surface facing the object, the partial dispersion ratio is Pgf=0.606, and in the case of the positive meniscus lens L14 having a convex surface facing the object, the partial dispersion ratio is Pgf=0.543, and the Abbe number at the d-line is νd=55.5. In the case of the positive meniscus lens L22 having a convex surface facing the object, which constitutes the second lens group G2, the partial dispersion ratio is Pgf=0.620, and the refractive index at the d-line is nd=1.846660. In the case of the negative meniscus lens L36 having a convex surface facing the object, which constitutes the third lens group G3, the partial dispersion ratio is Pgf=0.620, and the refractive index at the d-line is nd=1.846660, and in the case of the positive biconvex lens L38, the partial dispersion ratio is Pgf=0.606, and the refractive index at the d-line is nd=1.795040.

Figure 7:
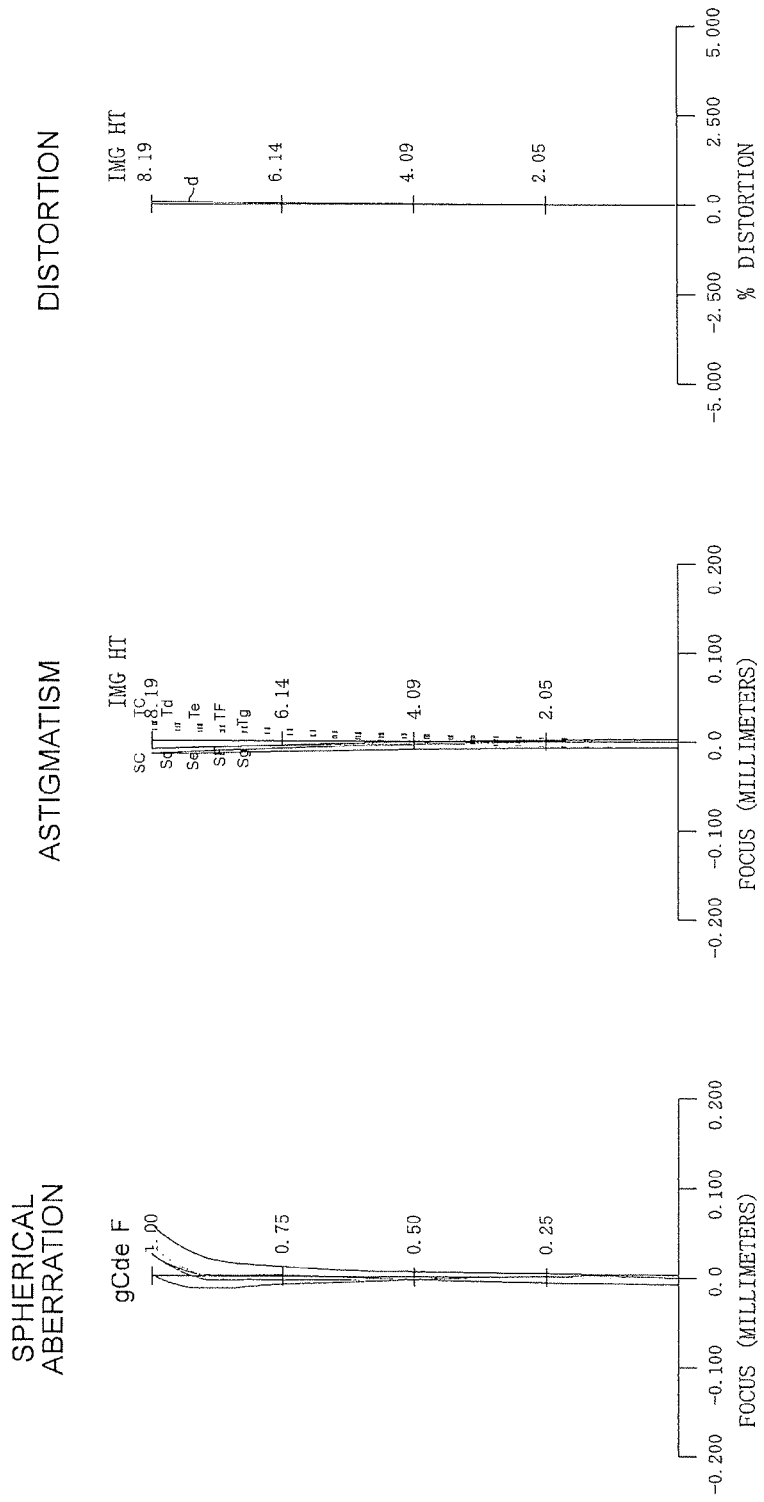
FIG. 7 is a set of graphs showing various aberrations (spherical aberration, astigmatism and distortion in order from the left) of the zoom lens according to Example 2 upon focusing on infinity in the wide-angle end state.
Figure 8:
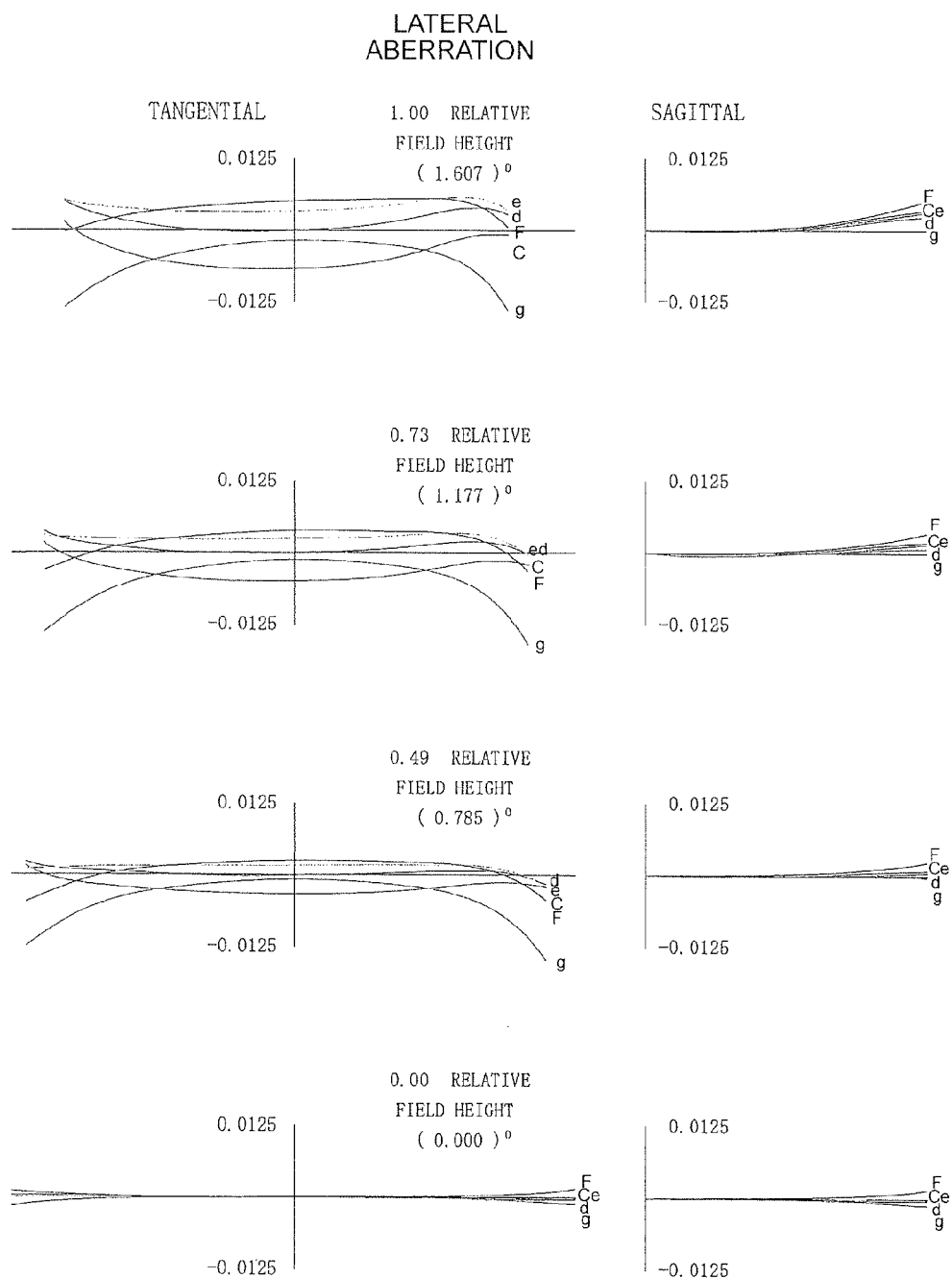
FIG. 8 is a set of graphs showing lateral aberrations of the zoom lens according to Example 2 upon focusing on infinity in the wide-angle end state.
Figure 9:
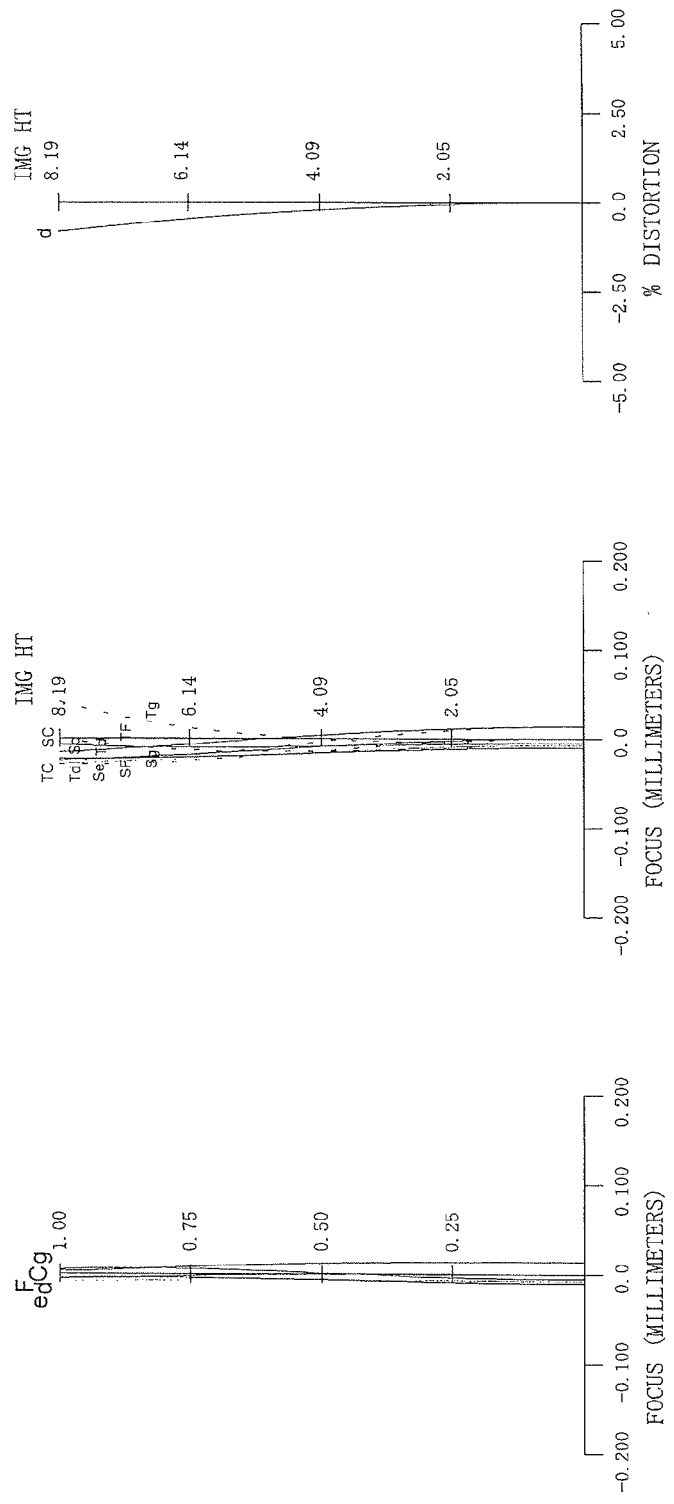
FIG. 9 is a set of graphs showing various aberrations (spherical aberration, astigmatism and distortion in order from the left) of the zoom lens according to Example 2 upon focusing on infinity in the telephoto end state.
Figure 10:
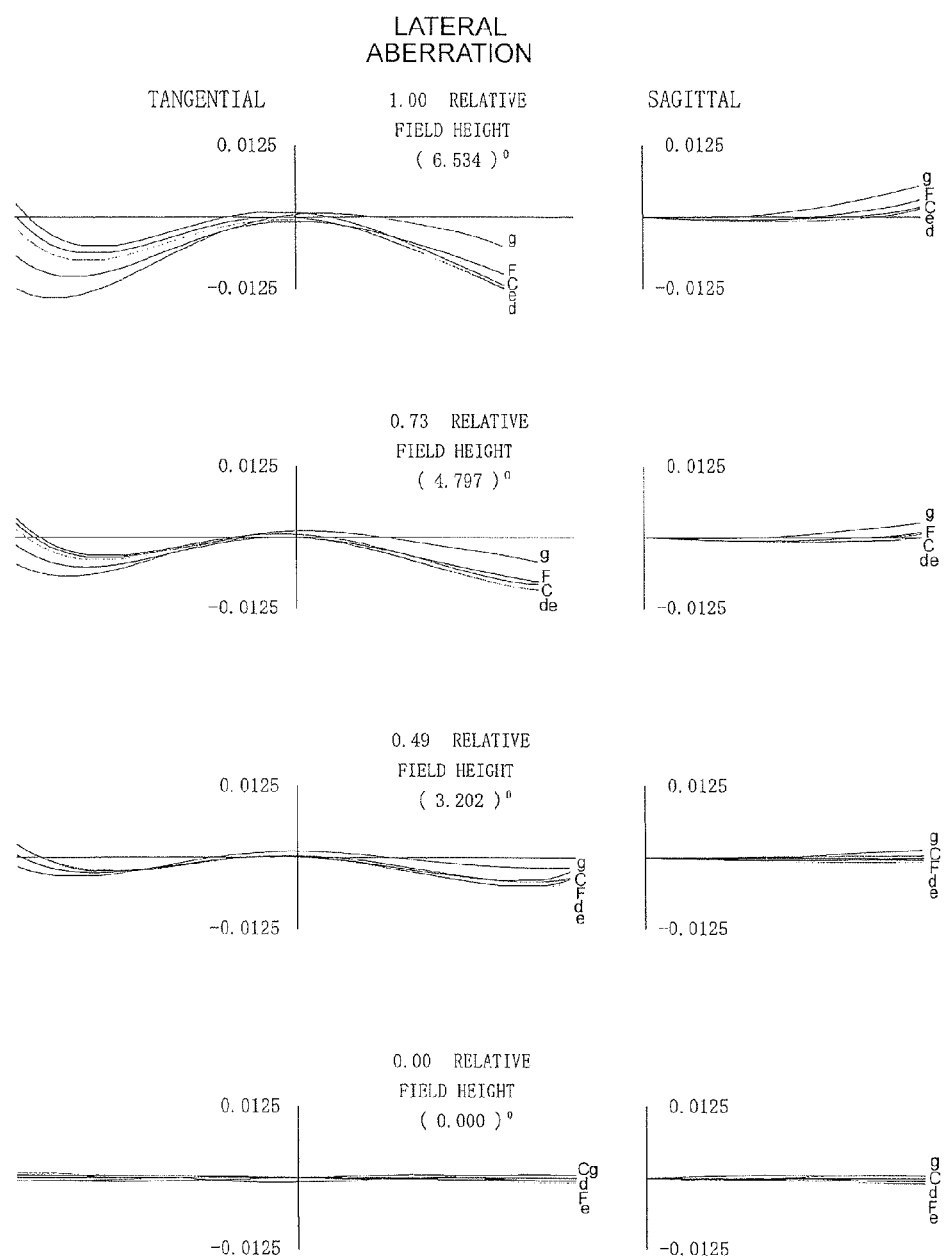
FIG. 10 is a set of graphs showing lateral aberrations of the zoom lens according to Example 2 upon focusing on infinity in the telephoto end state.

FIG. 7 to FIG. 10 are graphs showing various aberrations of the zoom lens ZL2 according to Example 2. Here FIG. 7 is a set of graphs showing various aberrations upon focusing on infinity in the wide-angle end state, FIG. 8 is a set of graphs showing lateral Aberrations upon focusing on infinity in the wide-angle end state, FIG. 9 is a set of graphs showing various aberrations upon focusing on infinity in the telephoto end state, and FIG. 10 is a set of graphs showing lateral aberrations upon focusing on infinity in the telephoto end state.

As each graph showing aberrations clarifies, in Example 2, various aberrations are satisfactorily corrected in each focal length state, frown the wide-angle end state to the telephoto end state, demonstrating excellent image forming performance.

To assist in understanding the invention, the invention was described using the configuration requirements of the embodiments, but needless to say, the present invention is not limited to these embodiments.

EXPLANATION OF NUMERALS AND CHARACTERS

ZL (ZL1, ZL2) zoom lens
G1 first lens group
G2 second lens group
G3 third lens group
DOE diffraction optical element
S aperture stop
I image plane
CAM camera (optical apparatus)

The invention claimed is:

1. A zoom lens comprising, in order from an object:
a first lens group having positive refractive power;
a second lens group having negative refractive power; and
a third lens group having positive refractive power,
the first lens group and the third lens group respectively moving toward the object upon zooming from a wide-angle end state to a telephoto end state,
the first lens group including a diffraction optical element in which two optical elements, constituted by optical materials of which refractive index difference at the d-line is 0.45 or less, are cemented and a diffraction optical surface on which diffraction granting grooves are formed exists on the interface of the two optical elements, and
the following conditional expressions being satisfied:

$$0.05 < \phi1/ft < 1.00$$

$$3.0 < \phi d/y < 10.0$$

where φ1 denotes an effective diameter of an optical surface closest to the object in the first lens group, ft denotes a focal length of the zoom lens in the telephoto end state, φd denotes an effective diameter of the diffraction optical surface, and y denotes a maximum image height of the zoom lens, and wherein
the first lens group includes at least one positive lens constituted by an optical material of which partial dispersion ratio is Pgf<0.58 and of which Abbe number at the d-line is νd<75, and at least one negative lens constituted by an optical material of which partial dispersion ratio is Pgf>0.59, and
the following conditional expression is satisfied:

$$0.50 < \{f1 + (-f2) + f3\}/ft < 1.50$$

where f1 denotes a focal length of the first lens group, f2 denotes a focal length of the second lens group, and f3 denotes a focal length of the third lens group.

2. A zoom lens comprising, in order from an object:
a first lens group having positive refractive power;
a second lens group having negative refractive power; and
a third lens group having positive refractive power,
the first lens group and the third lens group respectively moving toward the object upon zooming from a wide-angle end state to a telephoto end state,
the first lens group including a diffraction optical element in which two optical elements, constituted by optical materials of which refractive index difference at the d-line is 0.45 or less, are cemented and a diffraction optical surface on which diffraction granting grooves are formed exists on the interface of the two optical elements, and
the following conditional expressions being satisfied:

$$0.05 < \phi1/ft < 1.00$$

$$3.0 < \phi d/y < 10.0$$

where φ1 denotes an effective diameter of an optical surface closest to the object in the first lens group, ft denotes a focal length of the zoom lens in the telephoto end state, φd denotes an effective diameter of the diffraction optical surface, and y denotes a maximum image height of the zoom lens, and wherein
the optical materials of the two optical elements are resin, and
the following conditional expressions are satisfied:

$$20.0 < fd/f1 < 700.0$$

$$0.002 < p/fw < 0.150$$

where fd denotes a focal length of the diffraction optical element, f1 denotes a focal length of the first lens group, p denotes a minimum pitch of the diffraction grating grooves formed on the diffraction optical surface, and fw denotes a focal length of the zoom lens in the wide-angle end state.

3. The zoom lens according to claim 1, wherein the second lens group includes at least one lens constituted by an optical material of which partial dispersion ratio is Pgf>0.60 and of which refractive index at the d-line is nd>1.55.

4. A zoom lens comprising, in order from an object:
a first lens group having positive refractive power;
a second lens group having negative refractive power; and
a third lens group having positive refractive power,
the first lens group and the third lens group respectively moving toward the object upon zooming from a wide-angle end state to a telephoto end state,
the first lens group including a diffraction optical element in which two optical elements, constituted by optical materials of which refractive index difference at the d-line is 0.45 or less, are cemented and a diffraction optical surface on which diffraction granting grooves are formed exists on the interface of the two optical elements, and
the following conditional expressions being satisfied:

$$0.05 < \phi 1/ft < 1.00$$

$$3.0 < \phi d/y < 10.0$$

where $\phi 1$ denotes an effective diameter of an optical surface closest to the object in the first lens group, ft denotes a focal length of the zoom lens in the telephoto end state, $\phi d$ denotes an effective diameter of the diffraction optical surface, and y denotes a maximum image height of the zoom lens, and wherein
the third lens group includes at least two lenses constituted by an optical material of which partial dispersion ratio is Pgf>0.60 and of which refractive index at the d-line is nd>1.55, and at least one negative lens in addition to the at least two lenses.

5. An optical apparatus having the zoom lens according to claim 1.

* * * * *